A. R. KELLER.
DEFLECTOR FOR MASHING MACHINES.
APPLICATION FILED SEPT. 9, 1909.
979,510.
Patented Dec. 27, 1910.
2 SHEETS—SHEET 1.
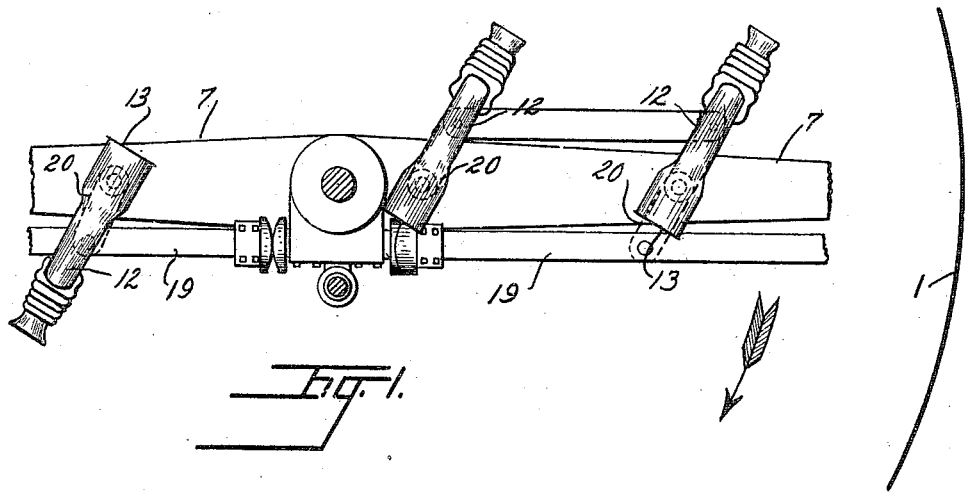
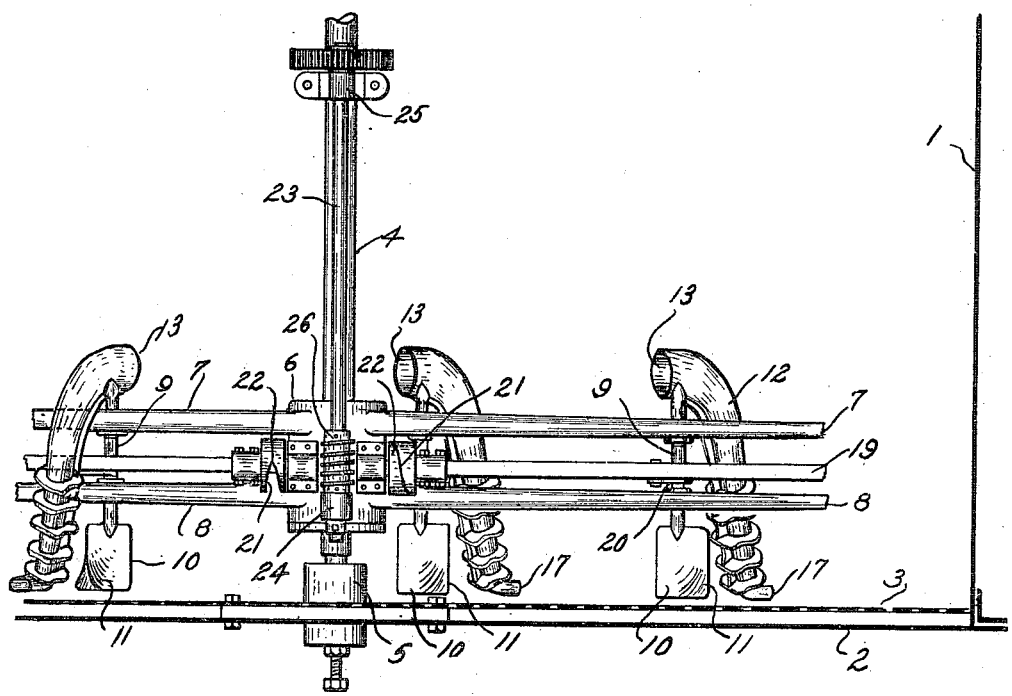
WITNESSES:
INVENTOR
Andreas R. Keller
BY Robert Klotz
ATTORNEY

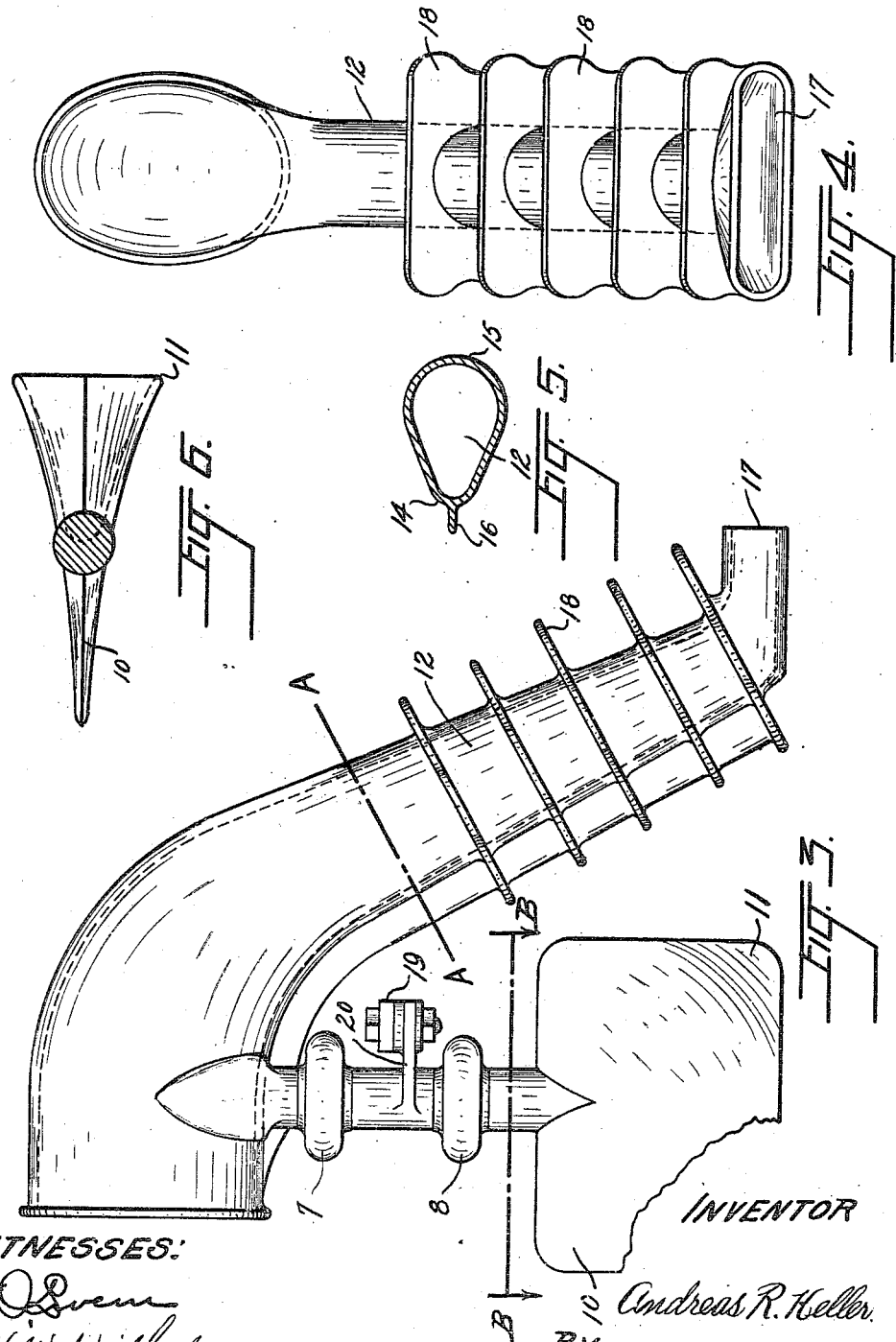

UNITED STATES PATENT OFFICE.

ANDREAS REINHARD KELLER, OF CHICAGO, ILLINOIS.

DEFLECTOR FOR MASHING-MACHINES.

979,510. Specification of Letters Patent. Patented Dec. 27, 1910.

Application filed September 9, 1909. Serial No. 516,841.

*To all whom it may concern:*

Be it known that I, ANDREAS REINHARD KELLER, a citizen of the United States, and residing at Chicago, in the county of Cook and State of Illinois, have invented a new and useful Improvement in Deflectors for Mashing-Machines, of which the following is a complete specification.

This invention relates to improvements in deflectors for mashing machines and more particularly to a deflector adapted to deflect the wort to the bottom of the tub, and to deflect the malt and grain toward the top of the tub.

In mixing mash there is always a tendency for the grain to settle to the bottom of the tub and to leave the wort in the upper portion comparatively free from grain. This is undesirable because the best results are obtained by bringing all parts of the wort into contact with all parts of the grain. Furthermore it is desirable to maintain a uniform temperature throughout the mash and this cannot well be accomplished without a thorough mixing of the ingredients.

The main objects of the invention are to provide a deflector for mashing machines which is adapted to convey the wort from the upper portion of the tub to the lower portion of the tub and to thoroughly mix it with the grain; to provide a deflector adapted to deflect the grain from the bottom of the tub upwardly through the wort, and to provide an improved construction adapted to mix the mash very rapidly and thoroughly, and maintain a uniform temperature.

A specific construction embodying said invention is shown in the accompanying drawings, in which, Figure 1 is a fragmentary plan view of a mashing machine provided with deflectors embodying this invention. Fig. 2 is a fragmentary side elevation of the same, showing the tub in section. Fig. 3 is an enlarged side elevation, of the deflector and agitator, showing the latter partly broken. Fig. 4 is a rear elevation of the deflector. Fig. 5 is a section taken on line A—A of Fig. 3. Fig. 6 is a section taken on line B—B of Fig. 3.

In the construction shown in said drawings, the mash tub 1 is provided with the usual tight and false bottoms 2 and 3, and a vertical drive shaft 4 is journaled in a suitable bearing 5 in the bottom of the tub. Rigidly secured on the drive shaft 4 is a sleeve or hub 6 on which are a plurality of radially directed arms 7 and 8, the former of which arms are located above and are parallel with the latter. Journaled in suitable bearings in said arms are a plurality of deflector shafts 9, each of which extends above the arm 7 and below the arm 8. On the lower end of each shaft is secured a stirrer or agitator 10, which may be of any preferred construction but is peferably formed of a vertically disposed blade which is split or divided vertically at its lower rear corner to provide oppositely turned wings 11 which act to throw the grain upwardly and laterally therefrom as they are moved through the mash.

Rigidly secured on the upper end of each shaft 9 is a deflector 12. Each of said deflectors comprises a tube which extends downwardly and rearwardly behind the arms 7 and 8 into close proximity to the false bottom 3 of the tub. The upper end or mouth 13 of said tube opens in the direction of the travel of the arms, and is of such height above the bottom of the tub that it travels in the upper portion of the wort. Said end is preferably elliptical in shape, with its greatest diameter disposed vertically. The tube decreases in size from said end and is preferably narrower at its forward side 14 than at the rear side 15, as shown more clearly in Fig. 5, so that it will travel through the mash with a minimum amount of resistance. On the forward side of the tube and extending longitudinally thereof is a strengthening rib 16. The lower or discharge end 17 is directed horizontally and opens rearwardly of the direction of travel of the tube. It is preferably flattened, as shown in Fig. 4, to provide a broad discharge opening for the wort and so as to spread the wort over as great an area of the bottom of the tub as possible. Rigidly secured on the tube, intermediate its ends, are a plurality of deflecting webs or fins 18, which preferably project on all sides of the tube and are inclined upwardly and rearwardly so as to deflect the grain upwardly and rearwardly toward the top of the wort.

The deflectors 12 may be arranged on the arms 7 and 8 in any desired manner, but they are preferably so arranged that those on one side of the shaft 4 will travel in paths alternating with the paths of those on the other side of the shaft, so that the travel of the ends 17 will cover approximately all of the bottom surface.

The mechanism for swinging or reciprocating the deflectors is the same as that shown in Patent No. 927976, granted to me on the 13th. day of July, 1909, for mashing machines. Said mechanism comprises a reciprocating bar 19 which is connected to arms or levers 20 rigidly secured on the deflector shafts 9. The bar is provided with oppositely disposed, stationary cam surfaces 21 which are acted upon by rotary cam surfaces 22 journaled on the bar. A worm shaft 23 is journaled in bearings 24 and 25 mounted on the hub 6 and shaft 4, respectively, and is provided with a worm 26 which drives said cams 22.

The driving mechanism for the shafts 4 and 23 is not shown but is preferably such as that shown in my prior patent above referred to.

The operation of the construction shown is as follows: The tub is filled with mash to a point covering or partially covering the mouths 13 of the tubes 12. The grain or malt tends to settle to the bottom of the tub instead of remaining suspended throughout the wort. As the arms 7 and 8 are revolved the deflectors travel about the shaft 4 and the clear wort in the upper portion of the tub enters the mouths of the tubes 12 and is conducted, by reason of the forward travel of the deflectors, to the bottom of the tub and is spread out over the bottom of the tub by the discharge opening 17. By this means the clear wort at the top of the tub is brought to the bottom and mixed with the grain and the grain is carried upwardly toward the surface of the wort by the currents created by the discharge from the tubes. At the same time the agitator works the grain from side to side and the blades 18 act to throw the grain upwardly in the wort. Not only are the grain and wort thoroughly and quickly mixed but the temperature of the mass quickly becomes uniform throughout.

While but one specific embodiment of the invention has been herein shown it is obvious that many details of the construction shown may be varied or omitted without departing from the scope of the claims.

I claim:

1. The combination with a drive shaft, of arms thereon, and downwardly and rearwardly directed tubular deflectors pivotally mounted on said arms.

2. The combination with a tub, of rotative arms mounted therein, and a plurality of downwardly and rearwardly directed, tubular deflectors pivotally mounted on said arms and adapted to convey material from the upper portion to the lower portion of the tub.

3. The combination with a tub, of horizontally rotative arms mounted therein, and a plurality of tubes carried on said arms, each of said tubes extending from a point above the arms downwardly and near the bottom of the tub, and adapted to convey material from the upper to the lower portion of the tub.

4. The combination with a tub of rotative arms mounted therein, deflector shafts journaled in said arms, a tubular deflector on each shaft adapted to deflect material from the top of the tub to the bottom thereof, and a plurality of inclined webs on each tube.

5. The combination with a tub of rotative arms mounted therein, vertical shafts journaled in said arms, means connecting said shafts and adapted to simultaneously turn them a partial revolution in either direction, a tubular deflector on each shaft extending from above the arm to the bottom of the tub, and an agitator blade on the lower end of each shaft.

6. The combination with a tub of rotative arms mounted therein, vertical shafts journaled in said arms, means connecting said shafts and adapted to simultaneously turn them a partial revolution in either direction, a tubular deflector on each shaft, said deflectors extending downwardly and rearwardly, a plurality of inclined webs on each deflector, and an agitator blade on the bottom of each shaft.

7. A deflector for mashing machines comprising a tube having a forwardly opening mouth and a downwardly and rearwardly directed body portion terminating in a laterally elongated discharge portion, and a plurality of webs on said tube.

8. A deflector for mashing machines, comprising a tube having a forwardly directed mouth and a rearwardly directed discharge orifice at a lower level than said mouth, and a plurality of inclined webs on said tube.

In testimony whereof I have hereunto subscribed my name in the presence of two witnesses.

ANDREAS REINHARD KELLER.

Witnesses:
W. W. WITHENBURY,
E. R. WALKER.